United States Patent [19]
Tal

[11] 3,910,300
[45] Oct. 7, 1975

[54] TENSIOMETER AND AUTOMATIC IRRIGATION CONTROL SYSTEM UTILIZING SAME

[76] Inventor: Aharon Tal, 131 Hanassi St., Herzliya, Israel

[22] Filed: Sept. 21, 1973

[21] Appl. No.: 399,508

[30] Foreign Application Priority Data
Sept. 29, 1972 Israel..................................... 40467

[52] U.S. Cl. ......................... 137/78; 47/38; 73/73; 200/83 A; 239/63; 251/65; 251/129
[51] Int. Cl.² ................. A01G 25/16; F16K 31/165
[58] Field of Search............. 73/73; 200/83 A, 83 R, 200/83 S; 137/78; 239/63, 64

[56] References Cited
UNITED STATES PATENTS

| | | | |
|---|---|---|---|
| 2,418,536 | 4/1947 | Wood................................ | 200/83 R |
| 2,445,717 | 7/1948 | Richards........................... | 239/63 X |
| 2,661,022 | 12/1953 | Latour............................... | 251/129 |
| 2,878,671 | 3/1959 | Prosser et al. ................... | 73/73 |
| 3,642,204 | 2/1972 | McCloskey........................ | 239/63 |

Primary Examiner—Martin P. Schwadron
Assistant Examiner—Richard Gerard
Attorney, Agent, or Firm—Benjamin J. Barish

[57] ABSTRACT

A tensiometer is described for measuring soil-moisture tension, including a tube hermetically sealed at one end and closed at the opposite end by a water-permeable body. The tube is adapted to contain a quantity of water which may pass through the body into and out of the ground in accordance with the soil-moisture tension. The tensiometer further includes a control member defining a chamber fillable with water from the tensiometer tube, the chamber being closed at one end by a flexible diaphragm one face of which is exposed for contact with the water in the chamber, the opposite face of the diaphragm being vented to the atmosphere. A stem is carried by the diaphragm and is urged in one direction by a spring, the stem being displaceable in the opposite direction by the flexing of the diaphragm in accordance with the soil-moisture tension. The displacement of the stem thus corresponds to the soil-moisture tension, and can be used for actuating an electrical switch or controlling a valve.

8 Claims, 3 Drawing Figures

U.S. Patent  Oct. 7, 1975  3,910,300
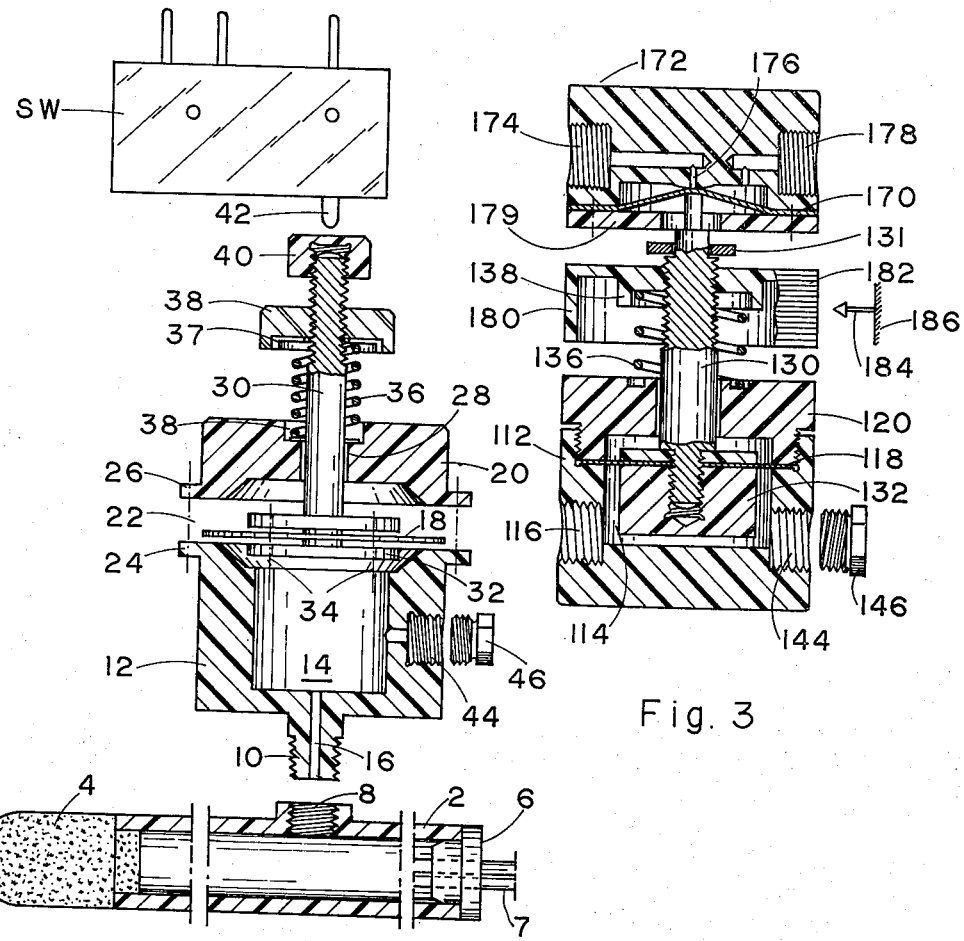
Fig. 3
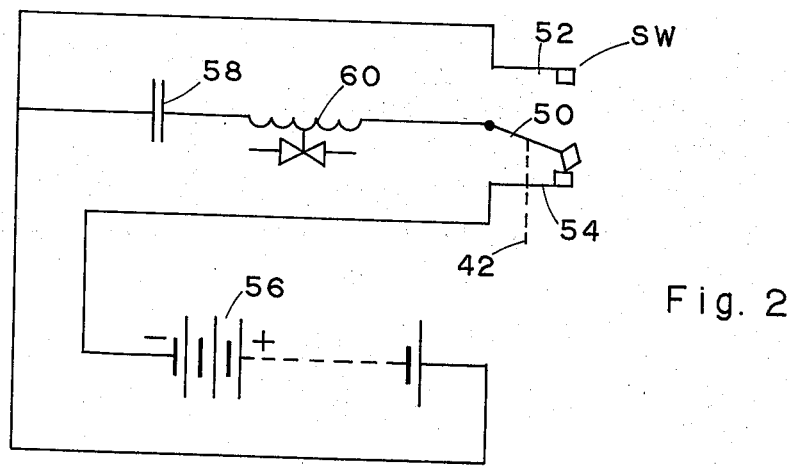
Fig. 1
Fig. 2

TENSIOMETER AND AUTOMATIC IRRIGATION CONTROL SYSTEM UTILIZING SAME

BACKGROUND OF THE INVENTION

The present invention relates to soil-moisture tensiometers and to automatic irrigation systems utilizing same.

Tensiometers are pressure-measuring devices for measuring the matric (suction) tension of soil for water, this tension being a function of the quantity of water in a given soil sample. In other words, soil suction measured by the tensiometer is a parameter of soil moisture but varies with the type of soil.

Several types of soil tensiometers are known. Generally they include a tube hermetically sealed at the top and closed at the bottom by a water permeable body (e.g. porous ceramic). The tube is filled with water, and the water-permeable end is inserted into the ground with the tube supported in a vertical or inclined position. Water within this tube passes through the water-permeable body in either direction (i.e., into or out of the ground) in accordance with the matric tension of the soil. The level of the liquid in the tube, or in another tube connected to it, serves as an indication of the moisture content of the soil.

SUMMARY OF THE INVENTION

An object of the present invention is to provide another form of tensiometer having advantages over the known forms as will be more fully discussed below. Another object is to provide an automatic irrigation system utilizing the novel tensiometer.

According to the invention, the tensiometer includes a control member defining a chamber communicating with the interior of the tube and to be filled with water therefrom. The chamber is closed at one end by a flexible diaphragm one face of which is exposed for contact with the water in the chamber, the opposite face of the diaphragm being vented to the atmosphere. The tensiometer further includes a stem carried by said diaphragm, and a spring urging the stem in one direction, the stem being displaceable in the opposite direction by the flexing of the diaphragm in accordance with the soil-moisture tension.

An advantage of this novel form of tensiometer is that the displacement of the stem carried by the flexible diaphragm can be used to actuate directly the device, such as an automatic irrigation system controlled by the tensiometer. Another advantage is that the chamber and flexible diaphragm can be designed to provide a desired amplification of the tension force, with minimum change in volume, thus more positively assuring actuation of the device controlled by the tensiometer.

According to a further feature of the invention, there is provided an automatic irrigation system including the novel tensiometer and a device actuated by the displaceable stem to control the irrigation system.

In one described embodiment, the device actuated by the stem includes a water valve having an operating coil, and an electrical circuit controlling the operating coil of the water valve, said electrical circuit including an electrical switch engageable by the stem when displaced a predetermined amount.

In another described embodiment, the device actuated by the control member system is a pilot valve of the automatic irrigation system. The pilot valve includes a second flexible diaphragm engageable by the displaceable stem to open and close the valve.

BRIEF DESCRIPTION OF THE DRAWINGS

The invention is herein further described, by way of example only, with reference to the accompanying drawings, wherein:

FIG. 1 illustrates one form of tensiometer constructed in accordance with the invention, the novel part of the tensiometer being shown in longitudinal section;

FIG. 2 is a circuit diagram of an automatic irrigation system controlled by the tensiometer of FIG. 1; and FIG. 3 is a longitudinal sectional view of another form of tensiometer constructed in accordance with the invention; the tensiometer being shown in combination with the pilot valve of the automatic irrigation system controlled by the tensiometer.

DESCRIPTION OF THE PREFERRED EMBODIMENTS

The tensiometer illustrated in FIG. 1 of the drawings comprises a tube 2 having porous ceramic cup 4 closing its lower end, and a cap 6 closing its upper end. Cap 6 may include a tube 7 to provide a connection to a manometer for indicating the actual soil-moisture tension.

Tube 2 is formed with a threaded opening 8 adapted to receive a connector element, namely a threaded nipple 10, of a control member 12. Control member 12 contains an internal chamber 14 communicating at one end with bore 16 through nipple 10 and closed at the opposite end by a flexible diaphragm 18. When nipple 10 is threaded into opening 8 of tube 2, bore 16 provides communication between the interior of tube 2 and chamber 14 of control member 12.

Flexible diaphragm 18 is secured to member 12 by means of a cap 20 which may be fastened to the member by any suitable means, such as by fasteners (schematically shown at 22) passing through flanges 24 and 26 formed on the member and cap, respectively. Cap 20 is further formed with a central opening 28.

A stem 30 is fixed at one end to flexible diaphragm 18, for example by a pair of mounting discs 32 secured to opposite sides of the diaphragm by means of fasteners (schematically shown at 34). The opposite end of stem 30 passes through opening 28 and projects outwardly from the member 12. Opening 28 also vents the upper face of diaphragm 18 to the atmosphere.

It will be seen that the water within tensiometer tube 2 fills chamber 14 via bore 16, and contacts the lower face of diaphragm 18 to deflect same (inwardly of the control member when the pressure within tube 2 is below atmosphere, as is the usual case) according to the pressure within tube 2. The deflection of diaphragm 18 causes the displacement of stem 30, the amount of displacement of the stem being therefore indicative of the pressure within tube 2 and of the soil moisture tension.

A biasing spring 36 is provided to urge the stem in the outward direction, i.e., opposite to the direction of flexing of the diaphragm. Spring 36 is a coiled spring, one end of which is seated within a recess 38 circumscribing opening 28 formed in end wall 20 of control member 12, and the opposite end of which engages the washer 37 of a nut 38 threadedly received on the end of stem 30. Nut 38 may be threaded inwardly of the stem to increase the biasing force produced by spring 36.

The tip of stem 30 carries a threaded cap 40 which may be adjustable with respect to the operator 42 of a snap-action switch SW actuated by the stem.

Control member 12 is formed with a port 44 communicating with internal chamber 14. Port 44 is normally closed by a threaded cap 46, but may be opened by removing the cap in order to purge chamber 14 of any trapped air.

The operation of the tensiometer illustrated in FIG. 1 will be apparent from the above description. It will be seen that the pressure within the tensiometer tube 2 is transmitted to chamber 14 via bore 16 and will act to deflect diaphragm 18 according to that pressure. The pressure within tube 2 is normally below atmospheric pressure (unless the field in which the tensiometer is used contains standing water), and therefore diaphragm 18 is normally deflected inwardly. Stem 30 is displaced with the deflection of diaphragm 18, the amount of displacement being an indication of the soil-moisture tension.

Nut 38 and cap 40 are both preset so that the latter disengages from operator 42 of switch SW when the sensed soil-moisture pressure has dropped below a predetermined value.

As shown in FIG. 2, switch operator 42 acts against the movable contact 40 of switch SW, the latter switch having two fixed contacts 52, 54. Switch SW controls an electrical circuit which includes a battery 56, a capacitor 58, and the operating coil 60 of a pilot valve, the latter being pulsed in one direction to open the valve, and in the opposite direction to close it.

The arrangement is such that when the soil moisture content is below a predetermined value, diaphragm 18 is flexed inwardly pulling with it stem 30, causing the latter to disengage from switch operator 42. In this case, movable contact 50 of switch SW engages fixed contact 54, whereupon battery 56 charges capacitor 58, the charging current also passing through operating coil 60 of the pilot valve. This causes the pilot valve to open, whereby irrigating water is supplied to the soil.

At the same time, capacitor 58 charges, thereby quickly terminating the flow of current through operating coil 60, but the pilot valve nevertheless remains open because, as indicated above, it is of the type which is pulsed to open, and must be pulsed in the opposite direction to close.

As the soil-moisture content increases by the supply of irrigating water, the pressure within tube 2 increases, and the deflection of diaphragm 18 is thereby reduced, whereupon the displacement of stem 30 is also reduced. At a specific point, predetermined by the setting of control member 12 as discussed above, stem 30 reengages switch operator 42 to move the latter's contact 50 into engagement with fixed contact 52. When this occurs, capacitor 58 discharges through operating coil 60 of the pilot valve, closing the valve, and thereby terminating the supply of irrigating water to the soil.

It will be seen that stem 30 of the tensiometer acts directly on switch operator 42 to control the irrigation system, thereby simplifying the automatic control of the irrigation system. In addition, chamber 14 and flexible diaphragm 18 can be designed to provide an appropriate amplification of the soil-moisture pressure as sensed by tensiometer tube 2, so as to increase the force applied to the device (operator 42 of switch SW) actuated by the tensiometer. The arrangement illustrated in FIG. 1, wherein the inner end of stem 30 is mounted to the diaphragm 18 by means of a pair of discs 32 fastened on opposite sides of the central portion of the diaphragm, is particularly advantageous since it produces a force amplification of the pressure within chamber 14 with a minimum change in volume of that chamber. This is because the pressure within chamber 14 is applied over the whole surface area of the inner disc 32, but the diaphragm only flexes at its annular portion between the discs and the mounting flanges 24, 26. Further, the tensiometer and control system may be constructed as a very simple, inexpensive, and easily maintainable unit, it having been found that a standard hearing aid battery used for battery 56 in FIG. 2 provides about 5,000 operations.

FIG. 3 illustrates another embodiment of the invention, for providing hydraulic actuation rather than electrical actuation, of the pilot valve in the automatic irrigation system.

In the embodiment of FIG. 3, control member 12 is formed with an internal chamber 114. The chamber communicates, via threaded bore 116, with the interior of the tensiometer tube (2, in FIG. 1) when the control member is attached to the tube, which may be done in any desired manner, such as shown in FIG. 1.

A flexible diaphragm 118 defines one end of chamber 114. Diaphragm 118 may be fixed within the control member in any suitable manner, being schematically shown in FIG. 3 as being held between the main portion of member 112 and its threaded cap 120. A stem 130 passes through a central opening formed in cap 120, one end of the stem being fixed to the diaphragm 118 by being threadedly received within a pair of discs 132 fixed to the central portion of the diaphragm, this arrangement also providing force amplification with minimum change in volume as in the FIG. 1 embodiment. The opposite end of stem 130 passes through cap 120, and its tip is engageable with another diaphragm 170 carried in a pilot valve, generally designated 172, for controlling the irrigation water supply.

Pilot valve 172 includes an inlet 174 for the irrigating water, the water passing through a channel 176 and then out through outlet 178. Diaphragm 170 and stem 130 act on channel 176 to open or close same for turning on or off, respectively, the irrigation water supply.

Thus, when the soil-moisture is below the predetermined value sensed by the tensiometer pressure within tube 2 (FIG. 1), diaphragm 118 is flexed inwardly, and thereby pulls in its stem 130 to open channel 176. This permits irrigating water to flow to outlet 178 of the pilot valve 172. As soon as the soil-moisture has increased to the predetermined value, the pressure within the tensiometer tube 2 increases, thereby lessening the deflection of diaphragm 118. Stem 130 therefore moves towards channel 176 of the pilot valve 172, causing the diaphragm 170 of the latter to close channel 176, thereby terminating the flow of irrigating water from the outlet 178 of valve 172.

To provide a type of snap-action to the closing and opening of channel 176, the end plate 179 of the pilot valve 172 may be made of or contain permanent magnetic material which attracts an iron portion of stem 130, or an iron ring 131 fixed thereto, to close channel 176 as the stem approaches it. When opening the channel, this magnetic force must first be overcome, which is done by flexing of diaphragm 118, the latter imparting a snap-action to the stem when overcoming the magnetic force.

The main valve (not shown) may be incorporated integrally with the pilot valve and the displaceable stem arrangement, if desired. Coil spring 136 and nut 138 may be used to preset the operating point of the automatic irrigation system, as described with respect to spring 36 and nut 38 in FIG. 1. In addition, a vacuum gauge may be provided in communicating with chamber 114 (or 14 in FIG. 1) graduated according to soil-moisture tension.

Also, nut 138 may carry a drum 180 having scale markings 182. These markings, when read in conjunction with an arrow 184 or other reference point carried on an element 186 fixed to control member 112 (such as cylindrical extension of the member), may be used for indicating the operating point of the tensiometer.

Control member 112 may also be formed with purging bore 144 closed by removable cap 146 to purge the housing of any trapped air.

Instead of attaching the control member (12 or 112) of FIGS. 1 and 3 directly to the tensiometer tube, it could of course be coupled thereto by tubing.

Many other variations, modifications and applications of the invention will be apparent.

What is claimed is:

1. A tensiometer for measuring soil-moisture tension, comprising:
    a tube adapted to contain water and to be inserted into the ground, said tube being closed at one end by a water-permeable body through which the water may pass into and out of the tube in accordance with the soil-moisture tension;
    a control member including a housing defining a chamber communicating with the interior of the tube, said chamber being closed by a flexible diaphragm one face of which is exposed to the interior of the chamber so that the diaphragm is deflected inwardly of the chamber upon the presence of a negative pressure in the tube and chamber;
    an apertured cap attached to the housing over the opposite face of the diaphragm and clamping the diaphragm between it and the housing, said opposite face of the diaphragm being vented to the atmosphere;
    a pair of discs fastened to the central portion of the diaphragm and having an outer diameter smaller than the portion of the diaphragm clamped between the housing and cap;
    a stem fastened at its inner end to the discs, the opposite end of the stem being threaded and passing through the aperture in said cap;
    a nut threaded on said opposite end of the stem; and
    a spring interposed between said nut and said cap and biassing said stem outwardly of the chamber.

2. A tensiometer as defined in claim 1, wherein the aperture in the cap is of larger diameter than said stem to thereby vent said opposite face of the diaphragm to the atmosphere.

3. A tensiometer according to claim 1, wherein said nut includes scale markings cooperable with a reference point on the control member.

4. An automatic irrigation system including a tensiometer according to claim 1, and a device actuated by said stem, when displaced a predetermined amount, to control the irrigation system.

5. A system according to claim 4, wherein said device includes a water valve having an operating coil, and an electrical circuit including an electrical switch engageable by the stem when displaced a predetermined amount.

6. A system according to claim 5, wherein said electrical circuit further includes a capacitor and a battery power supply, engagement of the electrical switch by the stem causing the battery to charge the capacitor by a charging current which also actuates the valve operating coil to open the valve, disengagement of the electrical switch by the stem causing the capacitor to discharge through the operating coil to close the valve.

7. A system according to claim 4, wherein said control device includes a pilot valve controlling the automatic irrigation system.

8. A system according to claim 4, wherein said outer end of the stem includes a ring of magnetic material, and said device actuated by the stem also includes magnetic material which attracts said ring to impart a snap-action to the movement of the stem by the diaphragm.

* * * * *